Dec. 25, 1934.  G. B. INGERSOLL  1,985,729
BALL AND SOCKET JOINT
Original Filed May 14, 1928   2 Sheets-Sheet 1
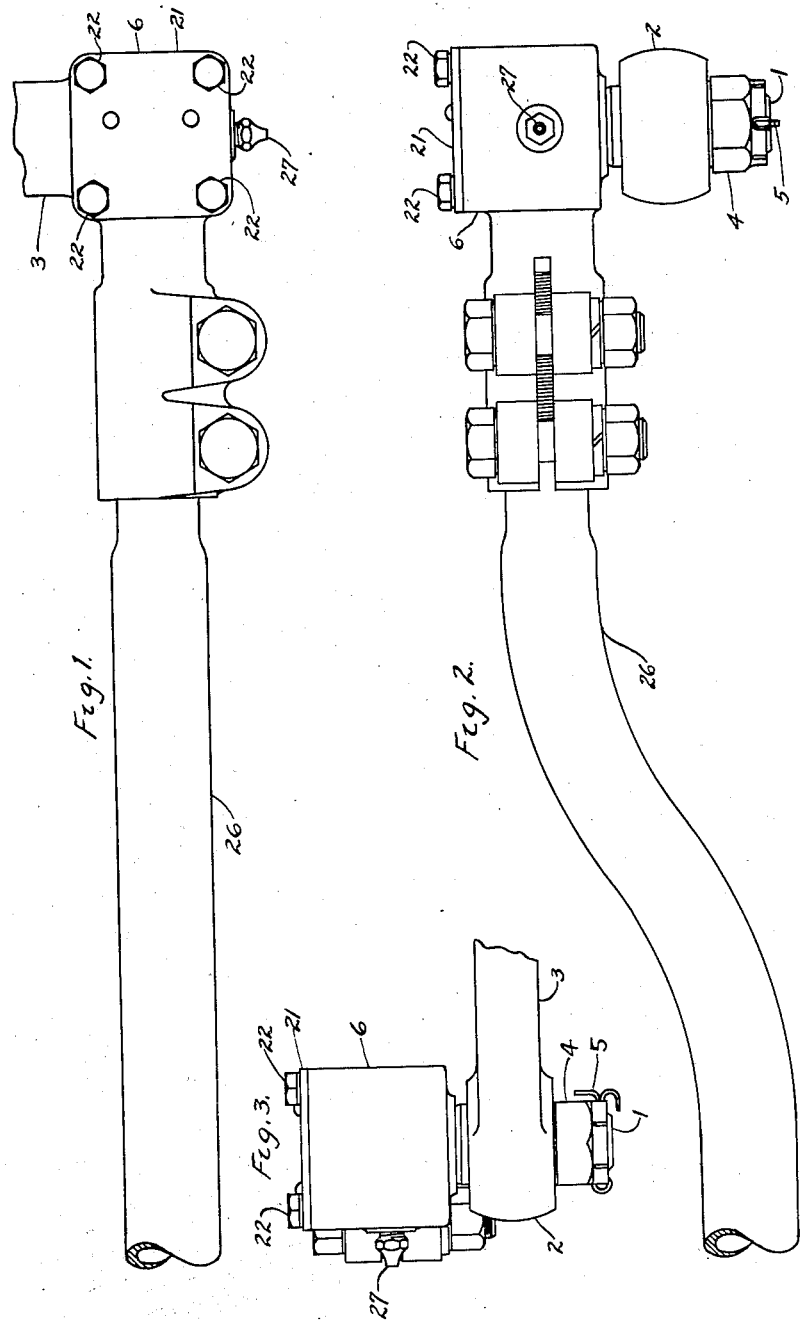
INVENTOR.
George B. Ingersoll

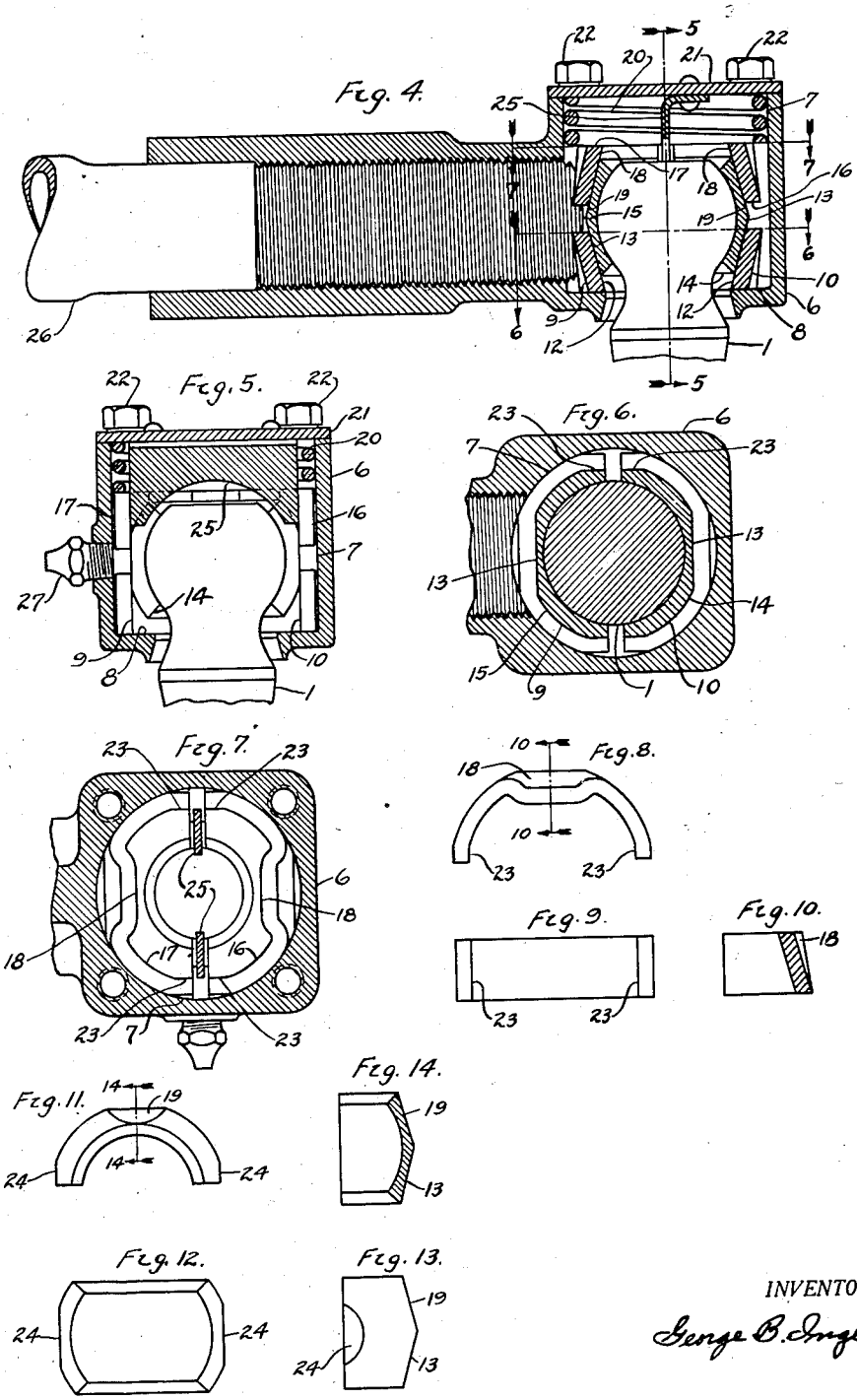

Patented Dec. 25, 1934

1,985,729

UNITED STATES PATENT OFFICE 1,985,729

BALL AND SOCKET JOINT

George B. Ingersoll, Dearborn, Mich., assignor, by mesne assignments, to Thompson Products, Incorporated, Cleveland, Ohio, a corporation of Ohio Application May 14, 1928, Serial No. 277,559
Renewed June 7, 1934

18 Claims. (Cl. 287—90)

My invention relates to improvements in ball and socket joints as used in the cross tie rod connecting the steering arms of the front axle in motor vehicles.

The object of this invention is, first, to provide a joint with ball sockets having maximum bearing surfaces on the sides of maximum thrust load; second, to provide a joint having an automatic means for adjusting each socket in an opposite direction from that of the maximum thrust load thereon; third, to provide a joint with ball sockets having automatic adjustment for their inner ball and their outer housing seats; fourth, to provide a joint capable of long life because of the exact seating of its component parts; fifth, to provide a joint having adjustable and removable ball sockets in a housing having a straight bore; sixth, to provide ball joint sockets having an automatic means capable of exerting its adjusting forces throughout the total circumference of the ball sockets at each of their ends; seventh, to provide ball socket joints having seats and adjusting parts that easily lend themselves to manufacture from pressed steel parts, if desired.

I attain these objects by the mechanism illustrated in the accompanying drawings, in which—

Figure 1 is a plan view of the ball and socket joint as assembled to a cross tie rod of a front axle; Fig. 2, a side elevation of the ball and socket joint assembled to a cross tie rod of a front axle; Fig. 3, an end view of the ball and socket joint assembled to a steering arm of a front axle; Fig. 4, a sectional side elevation of the ball and socket joint assembled on a steering ball stud; Fig. 5, a sectional view of the joint on the line 5—5, Fig. 4; Fig. 6, a sectional view of the joint on line 6—6, Fig. 4; Fig. 7, a sectional view of the joint on the line 7—7, Fig. 4; Fig. 8, a plan view of one of the adjusting members; Fig. 9, a side view of the above mentioned adjusting member; Fig. 10, a sectional view of the above mentioned adjusting member on the line 10—10, Fig. 8; Fig. 11, a plan view of one of the ball seats or socket pieces; Fig. 12, a side view of one of the ball seats or socket pieces; Fig. 13, an end view of one of the ball seats or socket pieces; and Fig. 14, a sectional view of the above mentioned ball seat or socket piece on the line 14—14, Fig. 11.

Similar numerals refer to similar parts throughout the several views. The ball stud 1 is assembled in the boss 2 of the steering arm 3 of a front axle assembly as used in motor vehicles, being held therein by the nut 4 and cotter pin 5. The housing 6 has a straight hole 7 which has a shoulder 8 at its lower end. The lower adjusting members 9 and 10 have their diameters fitted to the hole 7 and bear against the shoulder 8. The lower adjusting members 9 and 10 have tapered seats 12 on which contact the lower tapered seats 13 on the socket pieces 14 and 15. The upper adjusting members 16 and 17 have tapered seats 18 which contact with the upper tapered seats 19 on the socket pieces 14 and 15 which fit over the ball stud 1. The spring 20 fits within the hole 7 and against the plate 21 which is fastened to the housing 6 by the screws 22.

The spring 20 tends to always force the upper adjusting members 16 and 17 into contact with the socket pieces 14 and 15, which in turn are forced, by contact with the tapered seat 12 on the lower adjusting members 9 and 10 into contact with the ball stud 1, thus automatically maintaining all bearing surfaces in proper contact and eliminating destructive wear on the parts. It is to be noted that each of the adjusting members 9, 10, 16 and 17 are provided with a flat surface 23 against which contacts a corresponding flat surface 24 on the socket pieces 14 and 15 thus providing for transferring any transverse thrust load on the ball stud 1 to the housing 6. A bracket 25 is fastened to the plate 21 and fits between the socket pieces 14 and 15 and thus maintains them in a correct position for efficiently taking the maximum thrust loads. The housings 6 are threaded and clamped to the tie rod 26. The coupling 27 provides for supplying lubricant to the ball joint and all wearing surfaces.

I claim:

1. In a ball and socket joint, the combination of a housing having a bore, a pair of spaced members in the bore of said housing, each of said spaced members having an inner tapered surface and thrust surfaces adjacent its ends, a pair of socket pieces, each of said socket pieces having two external tapered surfaces, one of the external tapered surfaces of each said socket pieces engaging the inner tapered surface of one of said spaced members, each of said socket pieces being further provided with surfaces engaging the thrust surfaces adjacent the ends of said spaced members, a pair of slidable members in the bore of said housing, each of said pair of slidable members having an inner tapered surface engaging the external tapered surface of one of said pair of socket pieces, each of said slidable members being further provided, adjacent its ends, with thrust surfaces engaging one of said pair of socket pieces, a ball stud extending within and engaging the said pair of socket pieces, and means for forcing said pair of slidable members into engagement with said pair of socket pieces.

2. In a ball and socket joint, the combination of a housing having a bore, a stud having a ball end extending within the bore of the housing, socket pieces enclosing the ball end of said stud, each of said socket pieces being provided with an external tapered surface and thrust surfaces adjacent its ends, a plurality of adjusting members enclosing said socket pieces, each of said adjusting members being provided with surfaces engaging the tapered and thrust surfaces on one of said socket pieces, and means for adjustably maintaining said adjusting members in contact with said socket pieces, said socket pieces thereby being adjustably maintained in contact with the ball end of said stud.

3. In a ball and socket joint, the combination of a housing having a bore, a stud having a ball end extending within the bore of said housing, socket pieces enclosing the ball end of said stud, fixed members enclosing said socket pieces, adjusting members enclosing said socket pieces, and means for forcing said adjusting members along the bore of said housing, said means thereby urging said socket pieces transversely into contact with the ball end of said stud.

4. In a ball and socket joint, the combination of a housing with a bore, a stud having a ball end extending within the bore of said housing, a pair of socket pieces enclosing the ball end of said stud, each of said socket pieces having a pair of inclined flat surfaces oppositely disposed, together with a pair of thrust surfaces, a pair of fixed members each having a flat inclined surface together with a pair of thrust surfaces, a pair of slidable members each having a flat inclined surface oppositely disposed from the flat inclined surfaces on said fixed members, said slidable members each being further provided with a pair of thrust surfaces, and means for adjustably maintaining said fixed and said slidable members in contact with said socket pieces, the flat inclined and thrust surfaces on said fixed and slidable members contacting with the similar surfaces on said socket pieces.

5. In a ball and socket joint for connecting a tie rod and a lever, the combination of a housing adapted to be connected to a tie rod, said housing being provided with a bore, a stud adapted to be connected to a lever, said stud having a ball end extending within the bore of said housing, socket pieces enclosing the ball end of said stud, each of said socket pieces being provided with a pair of oppositely inclined surfaces together with a plurality of thrust surfaces, a plurality of fixed members, each of said fixed members contacting with one of the oppositely inclined surfaces of each of said socket pieces, each of said fixed members further contacting with the thrust surfaces on one of said socket pieces, a plurality of slidable members, each contacting with one of the oppositely inclined surfaces of each of said socket pieces, each of said slidable members further contacting with the thrust surface on one of said socket pieces, and means for maintaining said slidable members in contact with said socket pieces.

6. In a ball and socket joint, a housing, a stud having a ball end extending within the bore of said housing, a plurality of socket pieces enclosing the ball end of said stud, each of said socket pieces having flat surfaces oppositely inclined, together with thrust surfaces, a plurality of slidable members in said housing, each of said slidable members contacting with one of the oppositely inclined flat surfaces of said socket pieces, each of said slidable members further contacting with the thrust surfaces on said socket pieces, and means for maintaining said slidable members in contact with said socket pieces.

7. In a ball and socket joint, the combination of a housing having a straight bore, a stud having a ball end extending within the bore of said housing, a pair of fixed seats, having tapered surfaces, in the bore of said housing, said pair of fixed seats being disposed below the center of the ball of said stud, a pair of slidable members, having tapered surfaces, in the bore of said housing, said pair of slidable members being disposed above the center of the ball of said stud, a plurality of socket pieces enclosing the ball end of said stud, said plurality of socket pieces being slidably mounted on the tapered surfaces of said fixed and said slidable members, said socket pieces being thereby restrained from revolving relative to said fixed and said slidable members, and means, suitably anchored, engaging and forcing the tapered surfaces of said slidable members against the tapered surfaces of said socket pieces, said means thereby adjustably maintaining said socket pieces in contact with said ball stud.

8. In a ball and socket joint, the combination of a housing having a bore, a stud having a ball extending within the bore of said housing, a plurality of spaced members in the bore of said housing, each of said spaced members being provided with a pair of thrust surfaces, each of said spaced members being further provided with an inclined thrust surface between said pair of thrust surfaces, a pair of socket pieces slidably mounted within said spaced members, each of said socket pieces having tapered surfaces engaging the thrust surfaces of said spaced members, and means for adjustably maintaining said socket pieces in contact with said fixed members and the ball of said stud.

9. In a ball and socket joint, the combination of a housing with a bore, a stud having a ball end extending within said bore, a plurality of socket pieces engaging the ball end of said stud, each of said socket pieces being made from material of uniform section, each of said socket pieces being further provided with tapered surfaces, a plurality of adjusting members engaging said socket pieces, said adjusting members being made from material of uniform section, each of said adjusting members being further provided with tapered surfaces engaging the tapered surfaces of said socket pieces, and means engaging and forcing said adjusting members in contact with said socket pieces, said socket pieces being thereby adjustably maintained in contact with the ball end of said stud.

10. In a ball and socket joint comprising a ball stud, the combination of a plurality of socket pieces having tapered surfaces, and a plurality of adjusting members enclosing said socket pieces, said adjusting members being made from material of uniform section, each of said adjusting members having one or more displaced sections, said displaced sections forming thrust surfaces for engaging the tapered surfaces of said socket pieces.

11. In a ball and socket joint, the combination of a housing with a bore, a stud having a ball end extending within the bore of said housing, a plurality of fixed members in said housing, each of said fixed members having a tapered surface, socket pieces engaging the ball end of said stud, said socket pieces being slidably mounted on the tapered surfaces of said fixed members, said socket pieces being thereby restrained from revolving relative to said fixed members, a plurality of slidable members in said housing, said slidable members having tapered surfaces engaging said socket pieces, said slidable members being thereby restrained from revolving relative to said socket pieces, and means for adjustably maintaining said socket pieces in contact with the ball end of said stud together with the tapered surfaces of said fixed and said slidable members.

12. In a ball and socket joint, the combination of a housing, a ball end, a plurality of socket members arranged in said housing and enclosing said ball end, each of said socket members having flattened portions, wedging members enclosing said socket members, said wedging members having flattened portions engaging the flattened portions of said socket members, and means engaging said wedging members, said means forcing said wedging members and said socket members together.

13. A ball joint connection comprising a ball stud, a housing having a cylindrical bore with an inturned radial flange at its upper end having an opening to admit the ball stud, a pair of segmental shells each having an outer surface fitting within the cylindrical bore of the housing and having inner flat surfaces inclined relative to the axis of the cylindrical bore, and ball seat members having inner bearing surfaces for engaging the ball and outer flat surfaces adapted to coact with the inclined flat surfaces of the segmental shells.

14. A ball joint connection comprising a ball stud, a housing having a cylindrical bore with an inturned radial flange at its upper end having an opening to admit the ball stud, a pair of segmental shells each having an outer surface fitting within the cylindrical bore of the housing and inner surfaces defining a plane surface inclined relative to the axis of the cylindrical bore, said shells being oppositely disposed in said bore with the big ends thereof bearing against the inner surface of the radial flange, ball seat members having inner bearing surfaces for engaging the ball and outer plane surfaces adapted to coact with the inclined plane surfaces of the segmental shells, and means for urging the ball and ball seat members towards the big ends of the segmental shells whereby to take up looseness in the ball joint.

15. A ball joint, comprising a housing, detached members providing oppositely inclined opposed flat surfaces within said housing, a ball of a ball stud positioned within said housing, separate ball seats cooperatively associated with said ball and said inclined surfaces and resilient means for maintaining said ball seats in wedging engagement with said ball and said members.

16. In a ball and socket joint, a socket housing, members therein providing inner convergent plane surfaces, a ball end of a stud within said housing, ball seats engaging said ball and having outer convergent plane surfaces conforming to and in constant surface contact with said first mentioned plane surfaces for varying adjustments of said ball seats therealong and means urging said ball seats into wedging engagement with said ball end and said members.

17. In a ball and socket joint comprising a housing and a ball stud extending therein, the combination of a plurality of socket pieces enclosing said ball stud, said socket pieces being made from material of uniform section, each of said socket pieces being provided with an inclined thrust surface and a plurality of additional thrust surfaces, and annular means having tapered surfaces engaging the inclined thrust surfaces of said socket pieces and other surfaces engaging said additional thrust surfaces.

18. In a ball and socket joint, the combination with a cylindrical socket housing and a ball end of a member disposed therein, of means disposed within said housing forming an automatic take-up bearing for said ball end including a plurality of coacting members, some of said members having discontinuous bearing surfaces engaging said ball end and other of said members having plane surfaces in sliding contact with said first members, said plane surfaces lying in a plane inclined at an angle to the axis of said housing and resilient means acting against one of said coacting members to constantly urge relative sliding movement of said coacting members along said inclined surfaces to effect closer contact between said bearing surfaces and said ball end.

GEORGE B. INGERSOLL.